Oct. 6, 1959   R. D. VAN MILLINGEN   2,907,205
TORQUEMETER
Filed July 9, 1956   2 Sheets-Sheet 1

INVENTOR
R.D. VAN MILLINGEN
by Mawhinney & Mawhinney
ATTYS.

Oct. 6, 1959  R. D. VAN MILLINGEN  2,907,205
TORQUEMETER

Filed July 9, 1956  2 Sheets-Sheet 2

INVENTOR
R. D. Van Millingen
By Mawhinney & Mawhinney
ATTYS.

United States Patent Office
2,907,205
Patented Oct. 6, 1959

2,907,205

TORQUEMETER

Reuel Duncan Van Millingen, Ravensthorpe, England

Application July 9, 1956, Serial No. 596,742

Claims priority, application Great Britain July 11, 1955

12 Claims. (Cl. 73—136)

This invention comprises improvements in or relating to torquemeters of the class comprising a torsionally resilient shaft through which the torque to be measured is transmitted, and a pair of members secured to the shaft at axially spaced points in its length, whereby on torque transmission in the shaft the members are displaced angularly with respect to one another by an amount dependent on the torque. In use of such torquemeters, the angular displacement of the members is measured by suitable observing means which may, for instance, be optical means.

If the torque being transmitted is a steady torque, the angular displacement which is always small, can be measured readily, but when, as often happens, cyclic torque variations or torsional vibrations of high frequency occur in the shaft, especially at certain critical rotational speeds, difficulties may be experienced in accurate measurement of the mean angular displacement. For instance, when using an optical torquemeter, the observed image may be blurred so preventing accurate measurement. Where there are cyclic torque variations errors may also occur if the observation is made at one particular angular position of the shaft, as is the case with most optical torquemeters.

It is usually impractical to damp out such torsional fluctuations in the torque transmitting shaft because the forces involved may be far too large to be affected by a damper of a size which can normally be accommodated.

This invention has for an object to avoid or to mitigate these difficulties.

According to the present invention, therefore, there is provided a torquemeter comprising a torsionally resilient shaft, a pair of members secured to the shaft respectively at axially-spaced points in the length of the shaft, the one rigidly and the other through torsionally resilient connecting means, whereby on torque transmission in the shaft said members are displaced angularly with respect to one another by an amount dependent on the torque, and damping means in which static friction is kept to a minimum, operative to resist movement between said members, whereby rapid fluctuations in the relative angular positions of said members as avoided, although such may still occur between said axially-spaced points of the torsionally-resilient shaft.

The damping means is essentially designed so that negligible mechanical friction occurs and so that damping out of the high frequency vibrations is effected solely through the high viscosity fluid.

According to a feature of this invention, the torsionally resilient connecting means may comprise a spindle of low torsional stiffness connected at one end to said other of the members and at its opposite end to one of said points in the length of the shaft. Such spindle may be stiffened against lateral deformation by a sleeve which surrounds the spindle, is rigidly secured at one end to the spindle and is supported at its other end through a bearing to be coaxial with the shaft.

According to another feature of this invention, therefore, the said damping means comprises co-operating elements on the pair of members secured to the shaft, said elements defining between them a space receiving a viscous fluid, and said elements having a small clearance from one another.

In one arrangement, one of said pair of members is a hollow body and carries annular channelled seal elements and the other of the members is accommodated within the hollow body and has secured to it a drum member affording co-operating seal elements and defining with the channelled seal elements a viscous-liquid-receiving space, said drum member having flanges in the space projecting with small clearance into the channels of the channelled seal elements. In such an arrangement, the said other of the members and drum member are connected to the torsionally resilient shaft through a spindle of low torsional stiffness, the hollow body being directly connected to the shaft, whereby in use of the torquemeter the cyclic torque variations or high-frequency torsional vibrations are accommodated by twisting of the spindle. Preferably, moreover, there is provided means to stiffen the spindle against lateral deflection.

Instead of having elements relying on viscous resistance, damping means may be employed which comprise means displacing fluid on relative angular displacement of the members and a restricted passage through which the fluid is displaced, or which comprise vanes on the pair of members acting as a vane-type pump or motor.

Alternatively, the damping means may be of the eddy-current electrical type.

One construction of torquemeter incorporating the invention will now be described with reference to the accompanying drawings, in which.

Figure 1:
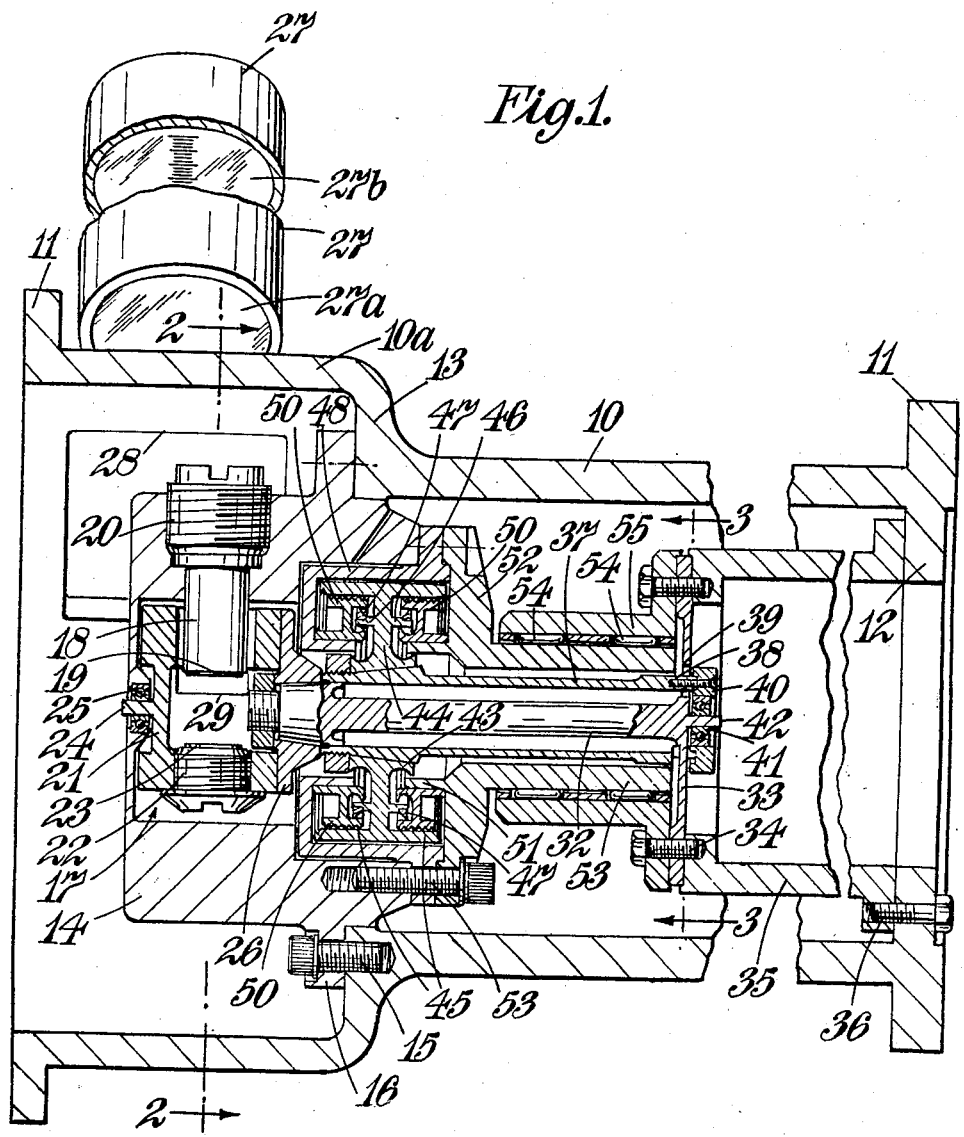
Figure 1 is an axial section through the torquemeter.

The torquemeter illustrated is an optical torquemeter as set forth in United States Serial No. 265,484, filed January 8, 1952, F. D. Brownhill and R. D. van Millingen, now Patent No. 2,768,525, but it will be understood that the invention is applicable in any form of torquemeter in which the torque being transmitted in a shaft is measured by determining the relative angular displacement of two members connected respectively to axially-spaced points in the shaft.

Referring to the drawings, the torquemeter comprises a torsionally resilient hollow shaft 10 having at each end a flange 11 by which the torquemeter is connected in a drive wherein the torque is to be measured. The shaft has an internal flange 12 at one end and at its opposite end is belled out to afford a larger diameter portion 10a which is connected to the main length of the shaft by a radial shoulder 13.

Figure 2:
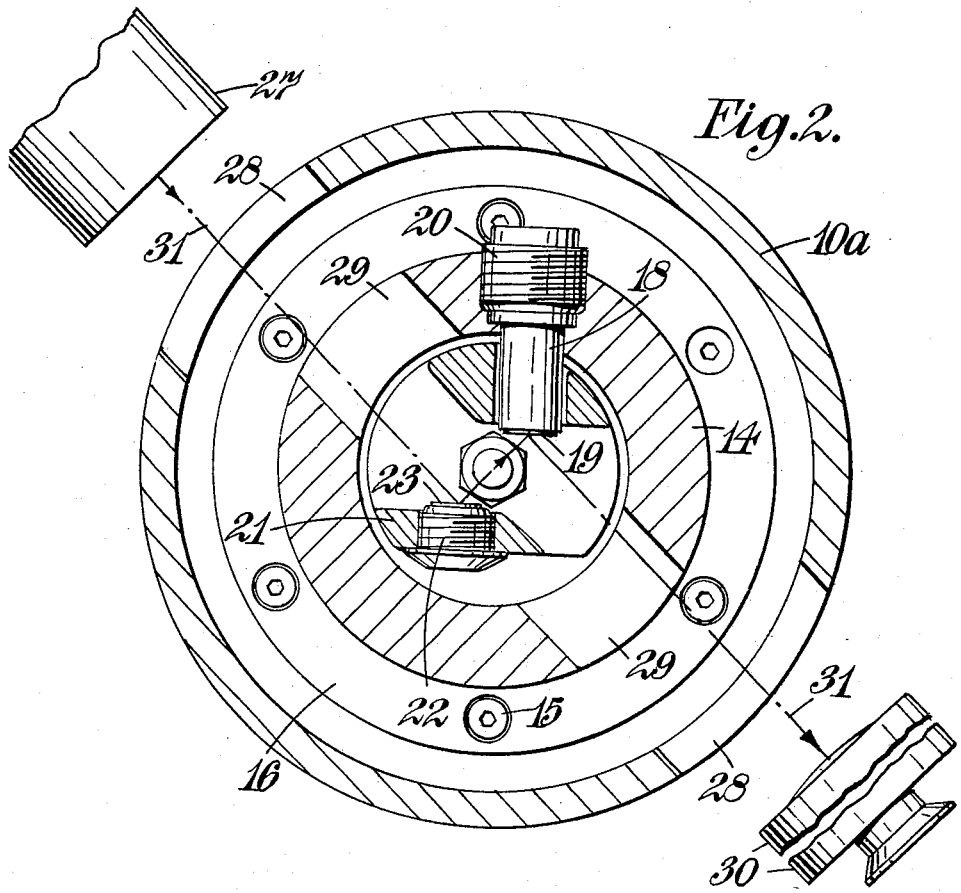
Figure 2 is a section on the line 2—2 of Figure 1.
Figure 3:
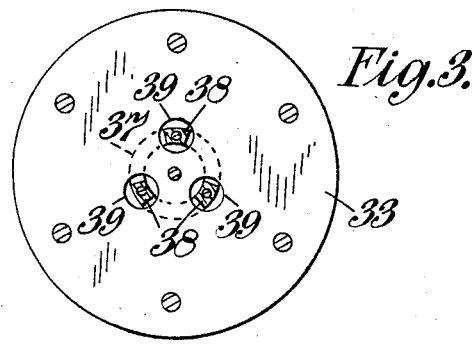
Figure 3 is a section on the line 3—3 of Figure 1.

A hollow body 14 (Figures 1 and 2) is mounted within the portion 10a of the shaft, the body being secured in position by set screws 15 passing through a peripheral flange 16 on the body to hold it against the shoulder 13. The body 14 has an internal cavity 17 into which projects one end of a mirror carrier 18 supporting a plane mirror 19, and the carrier is locked in position by a screw plug 20. A second mirror 23 is mounted on a plug 22 threaded in a cage 21 comprising a solid piece of metal of almost circular section interrupted only by ports 29 for the passage of light and the hole through which mirror holder 18 passes with sufficient clearance to allow the necessary relative angular movements. This construction is symmetrical and extremely rigid and minimises the tilting of mirror 23 under centrifugal loading. The cage 21 has at one side a trunnion pin 24 engaging a bearing 25 coaxial with the shaft 10 and at its other side is secured to a disc 26 which is connected to the flange 12 as will be described below. It will thus be clear that the cage 21 moves angularly with respect to the body 14 during torque transmission through the shaft 10 and this angular movement is measured by observing an illuminated scale.

For example, the scale 27b may be placed at the focus of the collimating lens 27a of a light collimating device 27 which directs a collimated image of the scale 27b through windows 28, 29 respectively in the portion 10a of the shaft and in the body 14, to be reflected by the mirrors 19, 23 in turn and finally to be directed through further windows 28, 29 into observing means such as a telescope 30. In the torquemeter illustrated, the mirrors are substantially parallel to one another and also to the axis of rotation of the shaft 10 and are arranged one on each side of the axis. An incoming beam of light striking one of the mirrors at 45° is deflected through 90° to strike the second mirror also at 45°, where it is again deflected through 90° and emerges parallel to its original direction. Light passes similarly by reflection when the incident ray strikes the first mirror a few degrees either side of the angle of 45°, and similarly emerges without change of direction. Since the light is collimated the same part of the scale appears in the centre of the field of vision of the telescope. In torque transmission however, the planes of the mirrors tilt through a small angle and a different part of the scale is seen. The path of the reflected light beam is indicated by the chain line 31 in Figure 2. At the same time light passing through that part of ports 28 axially beyond the end of body 14 is never deflected and forms a second reference image of the scale of the collimator 27.

If the torque is steady, then no difficulty is experienced in observing the extent of deflection; however, in many uses of a torquemeter, such for instance when measuring the torque delivered by a piston engine, the torque fluctuates rapidly and difficulty may be experienced in obtaining an accurate measurement of the mean deflection.

The torquemeter of this invention avoids this difficulty by providing between the cage 21 and the body 14 damping means in which there is no mechanical contact, the damping effect being obtained by using a highly viscous liquid to create a drag between these parts.

The particular arrangement illustrated for obtaining this effect is as follows.

The disc 26 is secured to one end of a thin spindle 32 of low torsional rigidity, the opposite end of the spindle having a wide radial flange 33 which is secured at its periphery by set screws 34 to one end of a transfer tube 35. The tube 35 is torsionally rigid as compared with the spindle 32 and extends from the flange 33 to the flange 12 to which the tube is secured by set screws 36.

A sleeve 37 surrounds the spindle 32 and is secured to the spindle at its end adjacent the disc 26. At its opposite end, the sleeve 37 has three axially projecting lugs 38 which extend freely through holes 39 in the flange 33 and which are secured to the outer race 40 of a bearing, the inner race 41 being mounted on a pintle 42 projecting from the flange 33.

At its end adjacent the disc 26, the sleeve 37 has secured on it a drum member of the damping means. The drum comprises a hub portion 43, a radial web 44, peripheral axially-extending drum-forming portions 45, and oppositely and axially-extending annular flanges 46 each of which carries at its end a triangular-section ring 47. The drum portions 45 fit with a small clearance within an annular pot 48, and the flanges 46 project into channels in labyrinth seal members 50, there being a small clearance between the rings 47 and the walls of the channels. One of the seal members is mounted in the pot and the second is carried on a flange 51 on a carrier member 52. The pot 48 and carrier member 52 are secured by set screws 53 to the body 14.

The pot is filled with a highly viscous liquid and thus a strong viscous drag will be obtained if the cage 21 tends to move rapidly with respect to the body 14. Thus in use of the torquemeter, rapid fluctuations in the relative angular positions of shoulder 13 and flange 12 are accommodated by twisting of the spindle 32 and corresponding movements of the body 14 and the cage 21 are avoided, so that the deflection observed indicates the average torque.

It has been found to be essential to avoid damping means in which any appreciable mechanical friction occurs and to effect the required damping solely through the viscous liquid.

The carrier member 52 is formed with a stub shaft portion 53 which encircles the sleeve 37 and supports on needle roller bearings 54 a hollow outer bearing member 55 which is secured by the set screws 34 on the end of transfer tube 35 which is thus supported laterally. Hollow member 55 also centres discs 33, pintle 42 and bearings 40, 41 and sleeve 37 and thus maintains the drum portion 45 of the damping means coaxial with the pot 48.

It will be appreciated that the invention may be employed with advantage in other forms of torquemeter than that just described. Also, instead of employing damping means as above described, a vanetype damper, or a damper having a restricted passage through which a, preferably viscous, liquid is displaced, or an eddy-current electrical damper may be employed.

I claim:
1. A torquemeter comprising a hollow torsionally-resilient shaft through which the torque to be measured is transmitted, a first member rigid with the shaft at a first position in the length thereof, a second member adjacent the first member and angularly displaceable about the axis of the shaft relative to the first member, a spindle of low torsional rigidity extending coaxially within the hollow shaft and connected at one end to the second member and its other end to the shaft at a second position in its length axially spaced from the first position, damping means in which static friction is kept to a minimum, said damping means being coaxial with the shaft and being operative between the first and second members to resist relative angular displacement thereof, whereby in transmission of torque through the shaft, the first and second members are displaced angularly by an amount dependent on the average torque, rapid angular displacements of the first and second members due to rapid fluctuations in the torque being avoided by twisting of the spindle, and means for observing the relative angular position of the first and second members.

2. A torquemeter as claimed in claim 1 comprising also a sleeve surrounding the spindle, said sleeve being coaxial with the shaft and spindle, and said sleeve being rigid with the spindle at one end thereof, a bearing adjacent the other end of the spindle and supporting said sleeve, whereby the spindle and sleeve provide an assembly having lateral rigidity but low torsional stiffness.

3. A torquemeter as claimed in claim 2, wherein said spindle is rigid with the sleeve adjacent the said second member and has at its opposite end a flange through which it is connected to the torsionally resilient shaft, wherein the bearing comprises relatively-rotatable parts, and wherein the sleeve has at its end adjacent the bearing lugs projecting freely through holes in said flange, the lugs being secured to one part of said bearing and the relatively-rotatable part of said bearing being mounted on said flange.

4. A torquemeter comprising a torsionally-resilient shaft adapted in operation to transmit the torque to be measured, a first member rigid with the shaft at a first position in its length, a second member adjacent the first member and angularly displaceable about the axis of the shaft with respect to the first member, a connecting member of low torsional rigidity coaxial with the shaft and connected at its one end to the second member and at its other end to the shaft at a second position in the length of the shaft spaced axially from the first position, damping means in which static friction is kept to a minimum, said damping means being coaxial with the shaft and being operative between said first and second members to resist relative angular displacement thereof, whereby in transmission of torque through the shaft the first and second members are displaced angularly with respect to one another by an amount dependent on the average torque in the shaft while rapid fluctuations in the torque are accommodated by twisting of the connecting member and corresponding fluctuations in the relative positions of the first and second members are avoided, and means for observing the relative angular position of the first and second members.

5. A torquemeter as claimed in claim 4, wherein said damping means comprises elements on each of said members, said elements defining between them a space receiving a viscous fluid and said elements having a small clearance from one another.

6. A torquemeter as claimed in claim 5, including labyrinth sealing means operative between said elements for retaining the viscous fluid within said space.

7. A torquemeter as claimed in claim 4, wherein one of said members is a hollow body and carries annular channelled seal elements and the other of said members is accommodated within the hollow body and has secured to it a drum member affording co-operating seal elements and defining with the channelled seal elements a viscous-liquid-receiving space, said drum member having flanges in the space projecting with small clearance into the channels of the channelled seal elements.

8. A torquemeter as claimed in claim 7, wherein the connecting member is a spindle of low torsional rigidity, said spindle being coaxial with the shaft and being connected at one of its ends to the second member and to the drum member and at its opposite end being connected to the torque transmitting shaft at said second point, the hollow body being directly connected to the shaft at the first point.

9. A torquemeter as claimed in claim 8, wherein the spindle is rigidly secured to the second member and to the drum member and is surrounded by a sleeve which is rigid with the second member at one end and is supported through a bearing adjacent said opposite end of the spindle, whereby an assembly is formed having lateral rigidity and low torsional stiffness.

10. A torquemeter as claimed in claim 9, wherein the spindle has a flange at said opposite end and the sleeve has lugs which pass freely through holes in said flange, the bearing having a first part secured to said lugs and a relatively-rotatable part supported from said flange on the spindle.

11. A torquemeter as claimed in claim 10, comprising a first stub-shaft secured to the flanged end of said spindle, a second stub shaft secured co-axially with said hollow body, said stub shafts being journalled one within the other, whereby said spindle is maintained co-axial with the hollow body.

12. A torquemeter as claimed in claim 4, wherein the second member has a central cavity, carries a mirror within the cavity, and is formed from a solid piece of material with axially-symmetrical holes leading to the cavity to receive a mounting for said mirror, to clear a mounting for a second mirror carried by the first of the members and projecting into the cavity, and to permit the passage of a light beam to and from the mirrors.

References Cited in the file of this patent

UNITED STATES PATENTS

| | | |
|---|---|---|
| 1,227,043 | Cummings | May 22, 1917 |
| 1,553,755 | Denny et al. | Sept. 15, 1925 |
| 1,881,301 | Thring | Oct. 4, 1932 |
| 2,007,220 | Smith | July 9, 1935 |
| 2,073,206 | Guthrie et al. | Mar. 9, 1937 |

FOREIGN PATENTS

| | | |
|---|---|---|
| 711,790 | Great Britain | July 14, 1954 |

(Corresponding to U.S. 2,768,525, Oct 30, 1956)